United States Patent
Huynh et al.

(10) Patent No.: US 9,950,782 B2
(45) Date of Patent: Apr. 24, 2018

(54) METHODS AND APPARATUS FOR INTEGRATING ROTARY ACTUATORS IN FLIGHT CONTROL SYSTEMS

(71) Applicant: The Boeing Company, Chicago, IL (US)

(72) Inventors: Neal Van Huynh, Seattle, WA (US); John A. Standley, Seattle, WA (US)

(73) Assignee: The Boeing Company, Chicago, IL (US)

( * ) Notice: Subject to any disclaimer, the term of this patent is extended or adjusted under 35 U.S.C. 154(b) by 737 days.

(21) Appl. No.: 14/529,694

(22) Filed: Oct. 31, 2014

(65) Prior Publication Data

US 2016/0229524 A1 Aug. 11, 2016

(51) Int. Cl.
| | |
|---|---|
| *B64C 13/30* | (2006.01) |
| *B64C 9/02* | (2006.01) |
| *B64C 13/28* | (2006.01) |
| *B64C 9/00* | (2006.01) |

(52) U.S. Cl.
CPC ............. *B64C 13/30* (2013.01); *B64C 9/00* (2013.01); *B64C 9/02* (2013.01); *B64C 13/28* (2013.01); *B64C 2009/005* (2013.01)

(58) Field of Classification Search
CPC .......... B64C 13/30; B64C 13/28; B64C 9/02; B64C 2009/005
See application file for complete search history.

(56) References Cited

U.S. PATENT DOCUMENTS

| | | | | |
|---|---|---|---|---|
| 2,371,976 A | * | 3/1945 | Patch ..................... | B64C 9/16 244/216 |
| 4,248,395 A | * | 2/1981 | Cole ....................... | B64C 9/04 244/216 |
| 4,381,093 A | * | 4/1983 | Rudolph ................. | B64C 9/16 244/216 |

(Continued)

FOREIGN PATENT DOCUMENTS

| | | |
|---|---|---|
| EM | 2669189 A1 | 12/2013 |
| WO | 2013119242 A1 | 8/2013 |

OTHER PUBLICATIONS

Extended European Search Report dated Mar. 31, 2016 in European Patent Application No. 15192080.8 (European counterpart of the instant U.S. patent application).

(Continued)

*Primary Examiner* — Christopher P Ellis
(74) *Attorney, Agent, or Firm* — Ostrager Chong Flaherty & Broitman P.C.

(57) ABSTRACT

Methods and apparatus for reacting rotary actuator and control surface loads into a wing structure using reaction links. The apparatus incorporates a structural interface feature that can facilitate a change of the component(s) in the load loop, such as the path connecting a control surface to a fixed aircraft structure via a rotary actuator. In particular, the structural interface between the rotary actuator and the rear spar of a wing can be tuned for stiffness to achieve an optimized load path that reacts actuator and control surface loads back into the wing structure. An actuator integration objective can be met for any rotary actuator using an integration method which tolerates wing and/or hinge line deflection.

20 Claims, 7 Drawing Sheets

(56) References Cited

U.S. PATENT DOCUMENTS

| | | | | |
|---|---|---|---|---|
| 4,544,118 | A * | 10/1985 | Robinson | B64C 9/06 244/215 |
| 4,605,187 | A * | 8/1986 | Stephenson | B64C 9/04 244/216 |
| 4,688,744 | A * | 8/1987 | Aldrich | B64C 13/28 244/213 |
| 5,054,374 | A | 10/1991 | Scobie et al. | |
| 5,098,043 | A | 3/1992 | Arena | |
| 5,722,616 | A | 3/1998 | Durand | |
| 5,864,922 | A | 2/1999 | Kraft | |
| 7,229,049 | B2 | 6/2007 | Ambrose | |
| 7,708,231 | B2 | 5/2010 | Lacy et al. | |
| 7,798,450 | B2 * | 9/2010 | Patzelt | B64C 3/50 244/211 |
| 7,878,459 | B2 * | 2/2011 | Mabe | B64C 9/32 244/213 |
| 7,891,611 | B2 | 2/2011 | Huynh et al. | |
| 8,226,048 | B2 * | 7/2012 | Beyer | B64C 9/22 244/201 |
| 8,684,316 | B2 * | 4/2014 | Sakurai | B64C 9/16 244/215 |
| 9,376,203 | B2 * | 6/2016 | Tieys | B64C 13/28 |
| 9,739,316 | B2 * | 8/2017 | Schwartz | F16D 3/32 |
| 2003/0080246 | A1 * | 5/2003 | Koizumi | B64C 9/02 244/99.3 |
| 2006/0065778 | A1 | 3/2006 | Kannapell | |
| 2013/0261852 | A1 * | 10/2013 | Recksiek | B64C 13/24 701/3 |
| 2013/0320151 | A1 | 12/2013 | Kordel et al. | |
| 2013/0327887 | A1 * | 12/2013 | Dyckrup | B64C 9/02 244/99.9 |
| 2014/0042269 | A1 * | 2/2014 | Zantz | B64C 13/28 244/99.3 |
| 2014/0336891 | A1 * | 11/2014 | Heintjes | F16D 43/02 701/68 |
| 2014/0346282 | A1 * | 11/2014 | Aljets | B64C 9/04 244/217 |
| 2015/0081102 | A1 * | 3/2015 | Kopp | B64C 13/30 700/275 |
| 2015/0360769 | A1 * | 12/2015 | Dege | B64C 13/28 244/213 |
| 2016/0194075 | A1 * | 7/2016 | Ungar | B64C 13/28 244/99.3 |
| 2016/0221694 | A1 * | 8/2016 | Haserodt | B64C 9/14 |

OTHER PUBLICATIONS

Communication dated Feb. 2, 2018 in European Application No. 15192080.8 (European counterpart of the instant patent application).

* cited by examiner

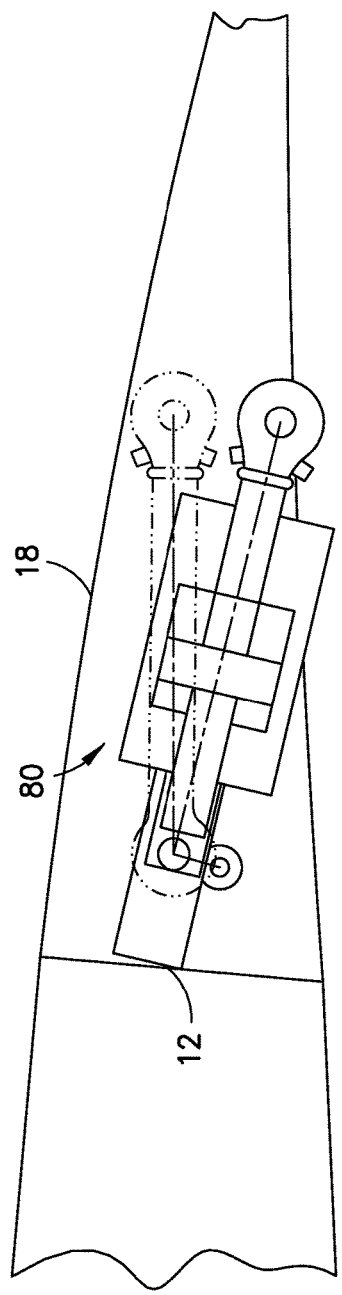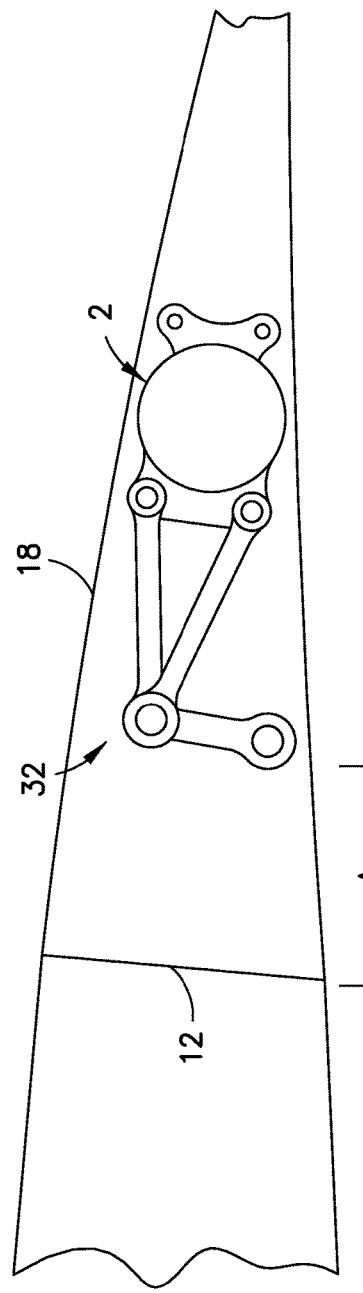

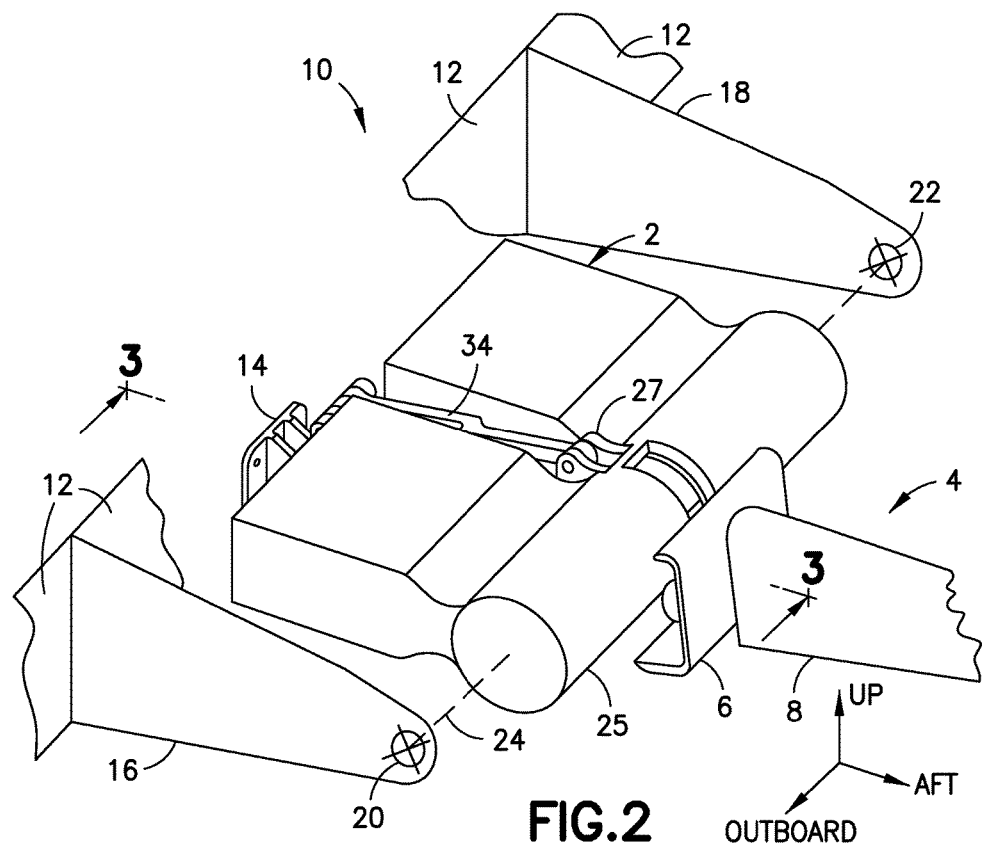
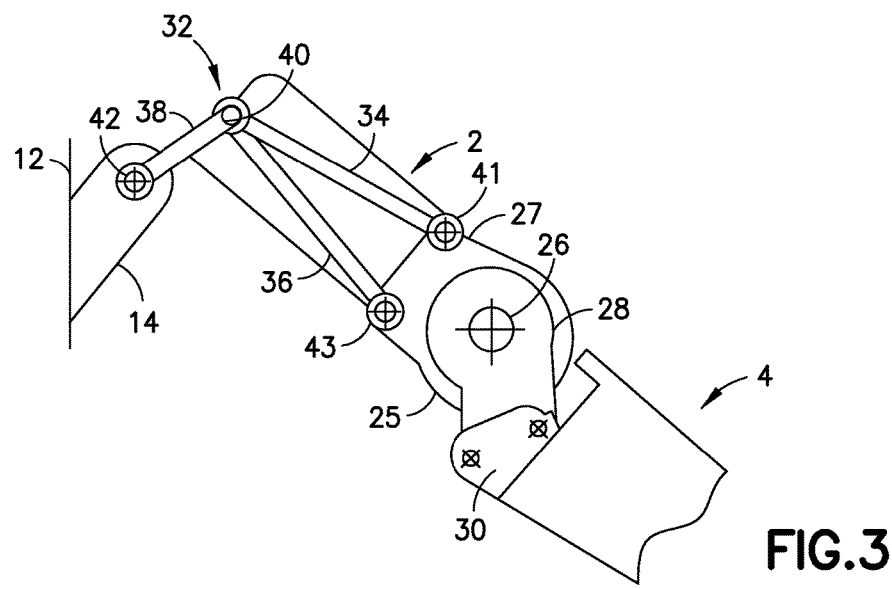

METHODS AND APPARATUS FOR INTEGRATING ROTARY ACTUATORS IN FLIGHT CONTROL SYSTEMS

BACKGROUND

This disclosure generally relates to methods and apparatus for integrating actuators in aircraft flight control systems. In particular, this disclosure relates to methods and apparatus for integrating rotary actuators in flight control systems with thin wings.

It is known to control pivoting movements of limited amplitude between two parts by means of a rotary actuator. Rotary actuators have the advantage of very small overall dimensions, because they can be positioned in accordance with the relative pivoting axis between the two parts. By comparison, the control of the same movement with the aid of a linear actuator makes it necessary to install the linear actuator on one of the parts, approximately perpendicular to the pivoting axis, and to connect the other part with the aid of a mechanism including at least one articulated link.

In particular, it is known to use rotary actuators to control pivoting of aircraft flight control surfaces such as ailerons. An aileron is a hinged flight control surface usually fitted in a pivoting manner to the rear spar of a fixed-wing aircraft. Ailerons are used in pairs to control the aircraft in roll. Each aileron has a limited deflection with respect to its median angular position where it is aligned with the wing.

The wings in high-performance aircraft are thin, that is, the distance between the top and bottom of the outer mold line (OML) at the control surface hinge line is small. Thin-wing aircraft create a challenge for spatial integration of actuation control systems with conventional linear piston actuator types. Rotary geared actuators (RGA) and rotary vane actuators (RVA) have been developed and used in thin-wing military aircraft.

Typically, an actuation system is confirmed by laboratory (system verification phase) and flight (aircraft verification phase) tests and the results usually require an adjustment of the stiffness value. It would be desirable to incorporate a feature that can facilitate a change of the component(s) in the load loop of a rotary actuation system and the change should have minimal impact on aircraft production.

SUMMARY

The subject matter disclosed herein is directed to an apparatus that incorporates a structural interface feature that can facilitate a change of the component(s) in a load loop, such as the path connecting a control surface to a fixed aircraft structure via a rotary actuator. In particular, the structural interface between the rotary actuator and the rear spar of an aircraft structure (such as a wing or a rudder) can be tuned for actuation stiffness to achieve an optimized load path that reacts actuator and control surface loads back into the wing structure. Also the interface as disclosed results in an empty space, behind the rear spar, which can be used for additional aircraft components or the rear spar can be moved aft, which accommodates more fuel capacity in the wing. The actuator integration objective can be met for any rotary actuator, i.e., rotary geared actuator, rotary vane actuator, or rotary piston actuator, using either of two integration methods (and variations thereof).

As used herein, the term "rotatable coupling" includes couplings having one (e.g., revolute joints) or more (e.g., spherical bearings) degrees of rotational freedom. As used herein, the term "spherical bearing" means a bearing that permits angular rotation about a central point in two orthogonal directions. A typical spherical bearing comprises inner and outer rings and a locking feature that makes the inner ring captive within the outer ring in the axial direction only. A spherical bearing allows rotation of a shaft or pin attached to the inner ring relative to the outer ring both about the shaft or pin axis and about an axis orthogonal to the shaft or pin axis. In the instant application, the spherical bearings assist in enabling the apparatus disclosed herein to accommodate wing and/or hinge line deflection.

In accordance with a first integration method, a housing of a rotary actuator is coupled to a rear spar of a wing by means of a linkage assembly comprising two reaction links and one hanger link which are rotatably coupled. These links provide the actuation reactive torque and transmit the reaction load to the rear spar of the wing. The rotary actuator further comprises an output shaft (which is ideally coaxial with the control surface hinge line) with an output crank that is mounted on the output shaft and fastened to the control surface so that the latter rotates when the former rotates. This design tolerates wing and/or hinge line deflection.

In accordance with a second integration method involving a rotary actuator having an output shaft which is preferably perpendicular to the control surface hinge line, the mass of the rotary actuator is supported by a floating beam which is oriented across two hinge ribs to which the control surface is hinged. In this case, the housing of the rotary actuator is coupled to the rear spar of the wing by means of a pair of reaction links. These reaction links provide actuation reactive torque and transmit the load to the rear spar. The floating beam is supported by self-aligning bearings at one end, while the other end is constrained by a cam slot and roller bearing so that all of the actuation reaction load will be carried by the reaction links. In this case, the rotary actuator is coupled to the control surface by means of a spatial four-bar linkage. This design also tolerates wing and/or hinge line deflection.

Various aspects of methods and apparatus for reacting rotary actuator and control surface loads into a wing structure using reaction links (described in more detail later) can be summarized as follows.

One aspect of the subject matter disclosed herein is an apparatus comprising: an aircraft structure; first and second hinges coupled to the aircraft structure; a control surface coupled to the first and second hinges; a rotary actuator comprising a housing and an output shaft rotatable relative to the housing, the output shaft being coupled to the control surface for causing pivoting of said control surface about a hinge line; and a first reaction link having a first end rotatably coupled to the housing of the rotary actuator.

In accordance with some embodiments, the aircraft structure comprises a first fitting, and the apparatus further comprises a first pin coupled to a second end of the first reaction link and a first spherical bearing that rotatably couples the first fitting to the first pin. Preferably, the aircraft structure further comprises a second fitting, and the apparatus further comprises a second reaction link having a first end rotatably coupled to the housing of the rotary actuator, a second pin coupled to a second end of the second reaction link, and a second spherical bearing that rotatably couples the second fitting to the second pin. In accordance with one implementation, the aircraft structure further comprises first and second ribs, wherein the second rib comprises a slot, the apparatus further comprising: first and second spherical bearings attached to the first rib; a roller bearing seated in the slot of the second rib; and a floating beam having one end connected to the first and second spherical bearings and another end connected to the roller bearing. In addition, the output shaft of the rotary actuator has an axis of rotation perpendicular to the hinge line of the control surface, and the apparatus further comprises an output crank connected the output shaft and a push rod having one end rotatably coupled to the output crank and another end rotatably coupled to the control surface.

In accordance with other embodiments, the apparatus further comprises a second reaction link having a first end rotatably coupled to the housing of the rotary actuator, and a hanger link having a first end rotatably coupled to respective second ends of the first and second reaction links and a second end rotatably coupled to the aircraft structure. In one implementation, the aircraft structure comprises a fitting, and the apparatus further comprises: a first pin coupled to the second end of the hanger link; a first spherical bearing that rotatably couples the fitting to the first pin; a second pin; a second spherical bearing that rotatably couples the first end of the hanger link to the second pin; a third spherical bearing that rotatably couples the second end of the first reaction link to the second pin; and a fourth spherical bearing that rotatably couples the second end of the second reaction link to the second pin. In addition, the output shaft of the rotary actuator has an axis of rotation parallel to the hinge line of the control surface, and the apparatus further comprises an output crank that connects the output shaft of the rotary actuator to the control surface.

In one typical application, the aircraft structure comprises a wing and the control surface comprises an aileron, wherein the wing comprises a rear spar and first and second hinge ribs attached to the rear spar, the first and second hinges being attached to the first and second hinge ribs respectively.

Another aspect of the subject matter disclosed herein is an apparatus comprising: an aircraft structure; first and second hinges coupled to the aircraft structure; a control surface coupled to the first and second hinges; a rotary actuator comprising a housing and an output shaft rotatable relative to the housing, the output shaft being coupled to the control surface for causing pivoting of the control surface about a hinge line; and a reaction link having a first end rotatably coupled to the housing of the rotary actuator and a second end rotatably coupled to the aircraft structure during pivoting of the control surface. In accordance with some embodiments, the aircraft structure comprises a fitting and first and second ribs, the second rib comprising a slot, and the apparatus further comprises: a pin coupled to a second end of the reaction link; a first spherical bearing that rotatably couples the fitting to the pin; second and third spherical bearings attached to the first rib; a roller bearing seated in the slot of the second rib; and a floating beam having one end connected to said second and third spherical bearings and another end connected to said roller bearing.

A further aspect of the subject matter disclosed herein is a method for distributing reaction forces from a rotary actuator to an aircraft structure, comprising: hinging a control surface to an aircraft structure; coupling an output shaft of a rotary actuator to the control surface; linking a housing of the rotary actuator to the aircraft structure; and operating the rotary actuator to cause pivoting of the control surface about a hinge line. In accordance with some embodiments, the linking step comprises rotatably coupling a first end of a reaction link to the housing of the rotary actuator and rotatably coupling a second end of the reaction link to a fitting of the aircraft structure. In accordance with other embodiments, the linking step comprises: rotatably coupling respective first ends of first and second reaction links to the housing of the rotary actuator; rotatably coupling respective second ends of the first and second reaction links to a first end of a pin; rotatably coupling a first end of a hanger link to the pin; and rotatably coupling a second end of the hanger link to a fitting of the aircraft structure.

Yet another aspect is a method for changing the stiffness of a stiffness path from a control surface through a rotary actuator to an aircraft structure, comprising: removing from the stiffness path a first reaction link having a first stiffness; and installing a second reaction link in the stiffness path in place of the first reaction link, the second reaction link having a second stiffness different than the first stiffness Other aspects of methods and apparatus for reacting rotary actuator and control surface loads into a wing structure using reaction links are disclosed and claimed below.

BRIEF DESCRIPTION OF THE DRAWINGS

FIG. 1A is a diagram showing an elevation view of a linear actuator of a flight control actuation system disposed behind a rear spar of a wing.

FIG. 1B is a diagram showing an elevation view of a rotary actuator of a flight control actuation system disposed behind a rear spar of a wing.

FIG. 2 is a diagram representing an exploded isometric view of some components of a flight control actuation system in accordance with one embodiment.

FIG. 3 is a diagram representing a sectional view of the flight control actuation system partly depicted in FIG. 2, the section plane being indicated by dashed lines 3-3 in FIG. 2.

Reference will hereinafter be made to the drawings in which similar elements in different drawings bear the same reference numerals.

DETAILED DESCRIPTION

Figure 4:
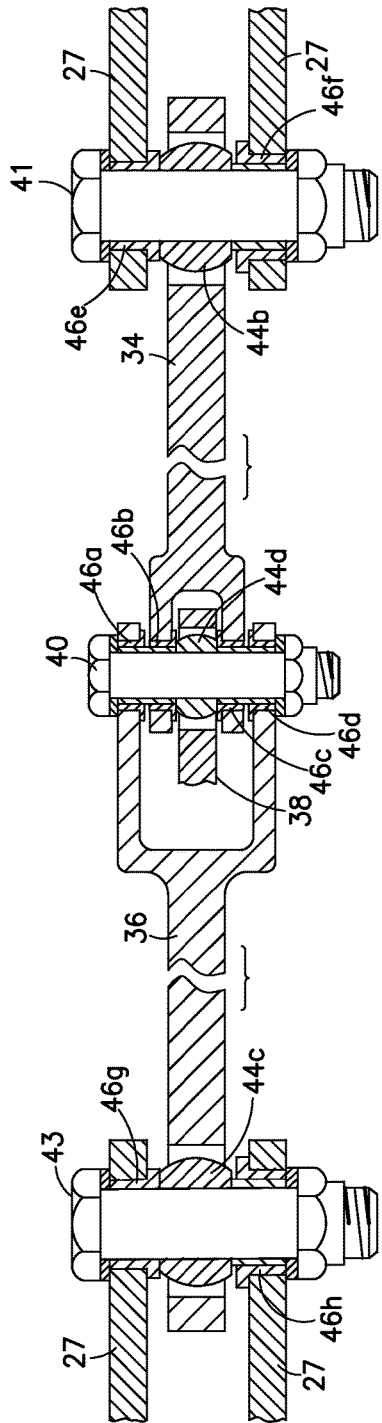
FIG. 4 is a diagram representing a sectional view of some of the components of the link assembly depicted in FIG. 3. For convenience, this sectional view shows the components as if the links on opposing sides of the central pin were coplanar. In fact, the two links shown in full are coupled to the same fitting and are disposed at the angle depicted in FIG. 3.

In accordance with Newton's third law of motion, if one object exerts a force on another object, then the second object exerts an equal and opposite reaction force on the first object. For example, when an output crank of a rotary actuator is driven to rotate by the application of force, which output crank in turns exerts force on a control surface, the control surface will produces an equal and opposite reaction force on the output crank, which in turn transmits that reaction force to the housing of the rotary actuator. The embodiments disclosed in detail below transmit rotary actuator and control surface reaction loads into a wing structure using stiff links which are rotatably coupled to the housing of the rotary actuator and to the rear spar of the wing. Stiff links that transmit reaction force are referred to herein as "reaction links".

The subject matter disclosed herein is directed to an apparatus that incorporates a structural interface feature that can facilitate a change of the component(s) in the load loop, such as the path connecting a control surface to a fixed aircraft structure via a rotary actuator. In particular, the structural interface between the rotary actuator and the rear spar of an aircraft structure (such as a wing or a rudder) can be tuned for actuation stiffness to achieve an optimized load path that reacts actuator and control surface loads back into the wing structure. Also the interface as disclosed results in an empty space, behind the rear spar, which can be used for additional aircraft components or the rear spar can be moved aft, which accommodates more fuel capacity in the wing.

FIG. 1A shows an elevation view of a linear actuator 80 of a flight control actuation system disposed behind a rear spar 12 of a wing. The linear actuator 80 can be extended or retracted to control the angle of a control surface 18. FIG. 1B shows an elevation view of a rotary actuator 2 of a flight control actuation system disposed behind a rear spar 12 of a wing. The rotary actuator is coupled to the wing by means of a link assembly 32. By using a rotary actuator 2 instead of a linear actuator 80, the area A behind the rear spar 12 is opened up for additional aircraft components or the rear spar 12 can be moved aft during wing design to accommodate more fuel capacity in the wing.

Various embodiments of apparatus for reacting rotary actuator and control surface loads into a wing structure of an aircraft using reaction links will now be described for purposes of illustration. One embodiment of an apparatus for reacting control surface forces to an aircraft wing will be described in detail with reference to FIGS. 2-5 and 10. Thereafter, another embodiment of an apparatus for reacting control surface forces to an aircraft wing will be described in detail with reference to FIGS. 6-9 and 11. However, it should be appreciated that the concept disclosed herein has application beyond an aircraft primary flight control system. In addition, the specific structures disclosed below (comprising a pair of reaction links with or without a hanger link coupling the reaction links to the fixed structure) can be varied without departing from the scope of the invention.

FIG. 2 shows an exploded isometric view of some components of a flight control system in accordance with one embodiment. In this example, the flight control system is mounted to the trailing edge of an aircraft structure 10 (only partly shown in FIG. 2). The aircraft structure 10 may be, for example, a wing or a rudder. The flight control system depicted in FIG. 2 comprises a rotary actuator 2 and a control surface 4 (also only partly shown in FIG. 2) which pivots during operation of rotary actuator 2.

Two or more actuators can be coupled to form a single rotary actuator 2. In accordance with the implementation depicted in FIG. 2, rotary actuator 2 is a rotary piston actuator comprising a housing 25 and a fitting 27 attached or joined to or integrally formed with housing 25. A typical rotary piston actuator is disclosed in U.S. Pat. No. 5,054,374, the disclosure of which is incorporated by reference herein in its entirety. In the alternatives, rotary actuator 2 may be a rotary geared actuator or a rotary vane actuator. The methods and apparatus disclosed herein have application to any known type of rotary actuator.

Still referring to FIG. 2, the control surface 4 comprises a front spar 6, a plurality of ribs 8 (only one rib is partly depicted) fastened, joined or connected to front spar 6, and an outer mold line. Only a portion of front spar 6 and a portion of a rib 8 are shown in FIG. 2. The outer mold line of control surface 4 is not shown in FIG. 2.

Similarly, only portions of the aircraft structure 10 are graphically depicted in FIG. 2, including portions of a rear spar 12, a fitting 14 attached to rear spar 12, and a pair of hinge ribs 16 and 18 having respective proximal ends attached to the rear spar 12. The hinge ribs 16 and 18 (which are graphically depicted as respective planes without width) may be parallel to each other. The control surface 4 is pivotably coupled to respective distal ends of hinge ribs 16 and 18 by respective hinges 20 and 22, which are graphically depicted in FIG. 2 by circles with quadrants. The hinge line 24 is indicated by a dashed line extending from hinge 20 to hinge 22 in FIG. 2. The control surface 4 pivots about hinge line 24 during operation of rotary actuator 2.

More specifically, as best seen in FIG. 3, the rotary actuator 2 comprises an output crank 28 which is fastened to a fitting 30 that is part of control surface 4. The output crank 28 in turn is attached to an output shaft 26 of the rotary actuator 2. The control surface 4 pivots when the output shaft 26 of rotary actuator 2 rotates. This design tolerates wing and/or hinge line deflection.

Still referring to FIG. 3, the housing 25 of rotary actuator 2 is connected to the fitting 14 of aircraft structure 10 by means of a fitting 27 and a linkage assembly 32. This linkage assembly 32 comprises: clevis pins 40, 41, 42 and 43; a hanger link 38 having one end rotatably coupled to clevis pin 40 and the other end rotatably coupled to clevis pin 42; a first reaction link 34 having one end rotatably coupled to clevis pin 40 and another end rotatably coupled to clevis pin 41; and a second reaction link 36 having one end rotatably coupled to pin 40 and another end rotatably coupled to clevis pin 43. The fitting 14 is rotatably coupled to the clevis pin 42, while the fitting 27 is rotatably coupled to clevis pins 41 and 43. The reactions links 34, 36 and the hanger link 38 provide the actuation reactive torque and transmit the reaction load to the rear spar 12 of aircraft structure 10.

Figure 5:
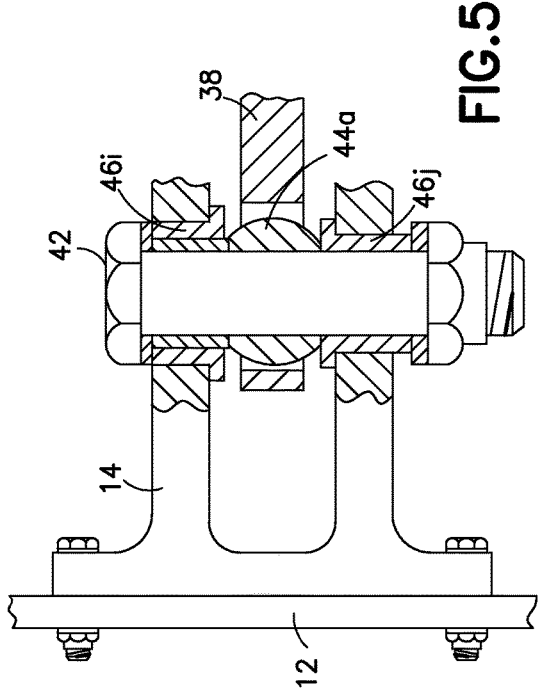
FIG. 5 is a diagram representing a sectional view of one end of a hanger link (part of the link assembly depicted in FIG. 3) pivotably coupled to a fitting attached to a rear spar of a wing.

The rotatable couplings of linkage assembly 32 are shown in more detail in FIGS. 4 and 5, which represent respective sectional views of some of the components depicted in FIG. 3. FIG. 4 is a sectional view of reaction links 34 and 36 on opposing sides of a clevis pin 40. It should be appreciated, however, that reaction links 34 and 36 are not coplanar, as depicted in FIG. 4. Respective portions of fitting 27 are depicted at opposite ends of FIG. 4 even though, in this embodiment, they are integrally connected to each other.

As seen in FIG. 4, the hanger link 38 has one end rotatably coupled to pin 40 by means of a spherical bearing 44d. One end of the first reaction link 34 is coupled to clevis pin 40 by means of revolute joints 46b and 46c, while one end of the second reaction link 36 is rotatably coupled to clevis pin 40 by means of revolute joints 46a and 46d.

As seen in FIG. 5, the other end of hanger link 38 is rotatably coupled to clevis pin 42 by means of a spherical bearing 44a. The fitting 14 is rotatably coupled to clevis pin 42 by means of revolute joints 46i and 46j.

As seen in FIG. 4, the other end of the first reaction link 34 is rotatably coupled to clevis pin 41 by means of a spherical bearing 44*b*. The fittings 27 are rotatably coupled to clevis pin 41 by means of revolute joints 46*e* and 46*f*. In addition, the other end of the second reaction link 36 is rotatably coupled to clevis pin 43 by means of a spherical bearing 44*c*. The fittings 27 are rotatably coupled to clevis pin 43 by means of revolute joints 46*g* and 46*h*.

Figure 10:
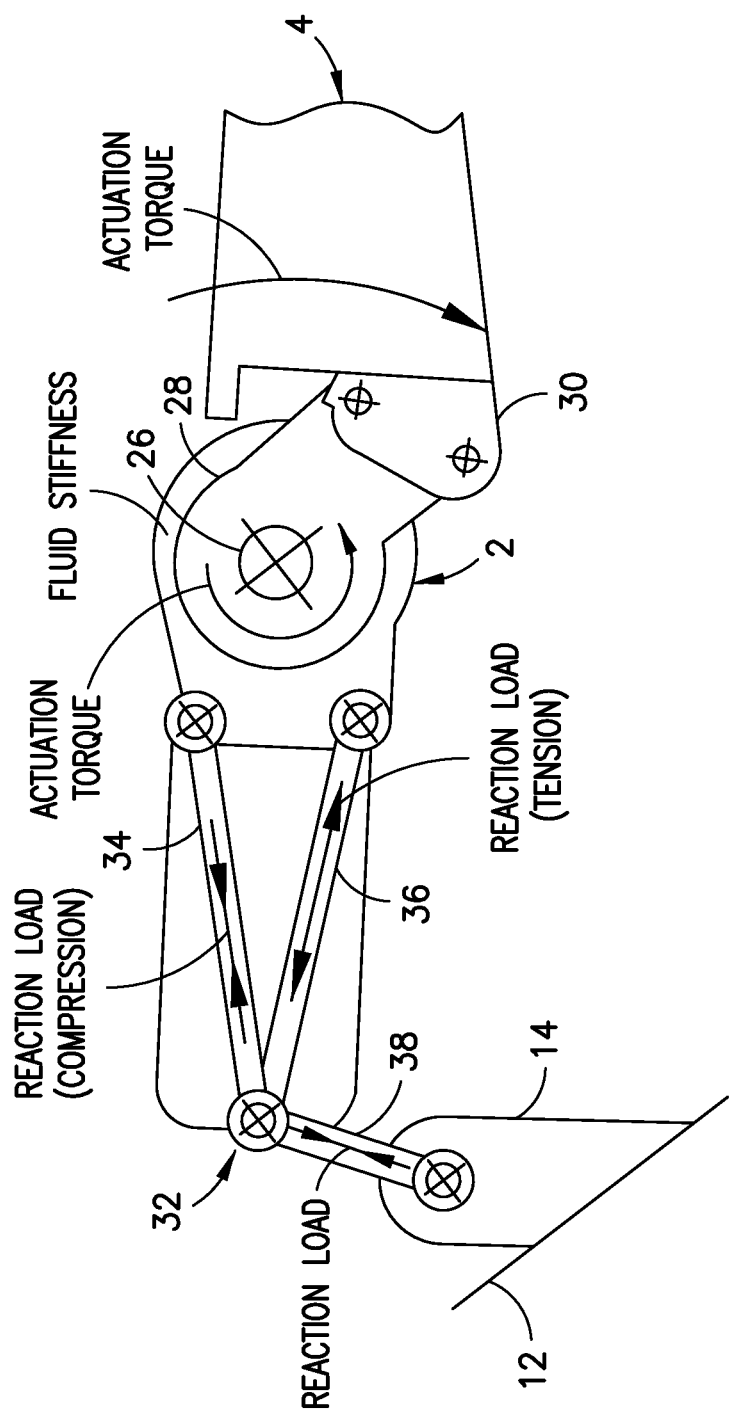
FIG. 10 is a diagram representing a sectional view virtually identical to that of FIG. 3, except for the addition of arrows indicating loads and torques typically produced during rotary actuation of a control surface.

FIG. 10 is a diagram representing a sectional view virtually identical to that of FIG. 3, except for the addition of arrows indicating loads and torques typically produced during rotary actuation of the control surface 4. The linkage assembly 32 distributes the reaction forces to the rear spar 12 of aircraft structure. This method of distributing reaction forces to the primary structure meets the actuator integration objective of minimal aircraft changes after initial design. This design results in minimal impact to production because, as shown in FIG. 10, the required stiffness path from the control surface 4 through the rotary actuator 2 to the aircraft structure can be met by changing the stiffness of one or both reaction links 34, 36. Each reaction link is a readily replaceable component that makes a large contribution to the total overall actuation system stiffness. More specifically, a method for changing the stiffness of a stiffness path from a control surface 4 through a rotary actuator 2 to an aircraft structure is provided, which method comprises: removing from the stiffness path a first reaction link (e.g., reaction link 34 or 36) having a first stiffness; and installing a second reaction link in the stiffness path in place of the first reaction link, the second reaction link having a second stiffness different than the first stiffness.

Figure 6:
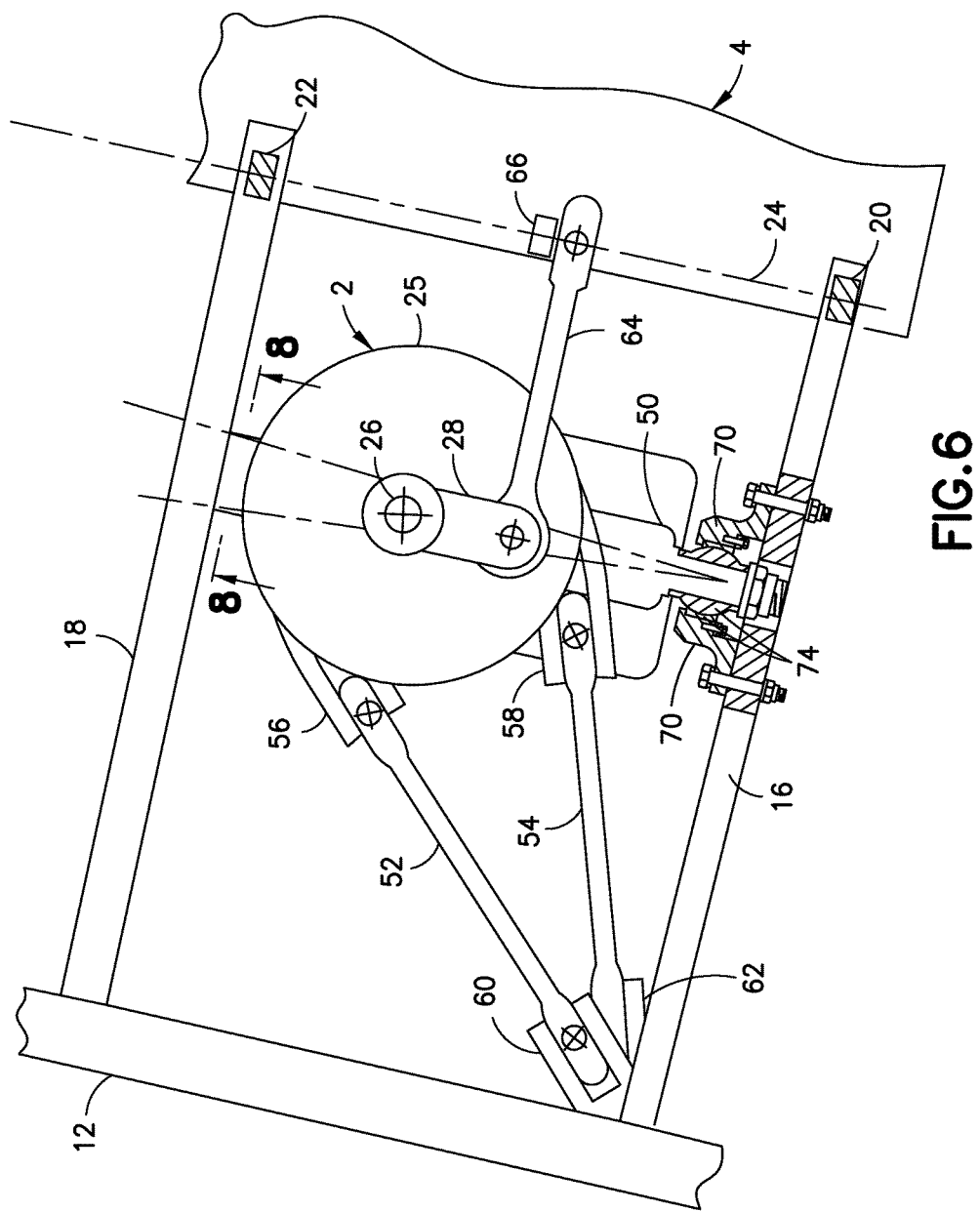
FIGS. 6 and 7 are diagrams representing plan and elevation views respectively of some components of a flight control actuation system in accordance with another embodiment.
Figure 7:
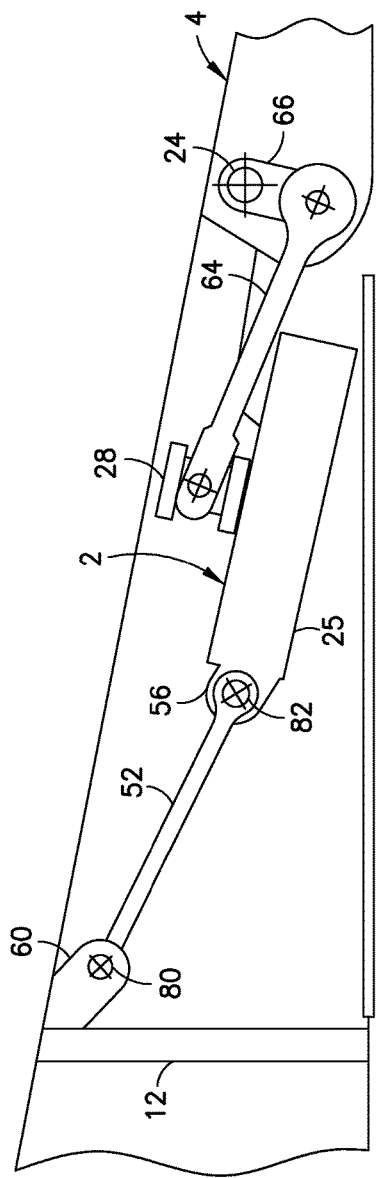

In accordance with a second integration method, an apparatus of the type depicted in FIGS. 6 and 7 can be used to distribute reaction forces to an aircraft structure. In this case, the rotary actuator 2 (e.g., a rotary piston actuator, a rotary geared actuator, or a rotary vane actuator) has an axis of rotation generally perpendicular to the hinge line 24 of the control surface 4.

Referring to FIG. 6, one pair of fittings 56 and 58 are attached or joined to or integrally formed with the housing 25 of rotary actuator 2. Another pair of fittings 60 and 62 are attached or joined to or integrally formed with the rear spar 12 of an aircraft structure. In accordance with one implementation, each of fittings 56, 58, 60, 62 comprises a clevis.

To distribute reaction forces, the fittings 56, 58 are respectively connected to fittings 60, 62 by means of respective reactions links 52, 54. Reaction link 52 has one end rotatably coupled to a clevis pin (not shown in FIG. 6, but see clevis pin 82 in FIG. 7) of fitting 56 and another end rotatably coupled to a clevis pin (not shown in FIG. 6, but see clevis pin 80 in FIG. 7) of fitting 60, while reaction link 54 has one end rotatably coupled to a clevis pin (not shown) of fitting 58 and another end rotatably coupled to a clevis pin (not shown) of fitting 62. In one implementation, the rotatable couplings between the fitting and reaction links are respective spherical bearings of the type previously described. Arranged in this way, the reaction links 52, 54 provide actuation reactive torque and transmit the reaction load to the rear spar 12 of the aircraft structure.

Figure 8:
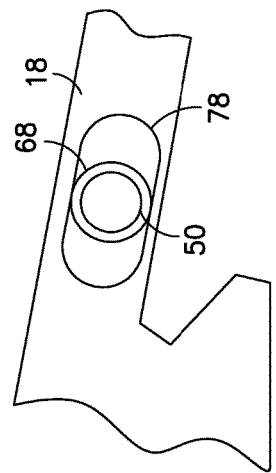
FIG. 8 is a diagram representing a sectional view of the embodiment depicted in FIG. 6, the section plane being indicated by dashed lines 8-8 in FIG. 6.

Referring to FIG. 6, the mass of the rotary actuator 2 is supported by a floating beam 50 which is oriented across a pair of hinge ribs 16 and 18. One end of floating beam 50 has a transverse shaft (not visible in FIG. 6) having opposing ends which are respectively supported (and surrounded) by a pair of self-aligning spherical bearings 74. Spherical bearings 74 mounted to hinge rib 16 by means of brackets 70. For example, spherical bearings 74 may comprise spherical roller bearings, Part #ZEF9000, commercially available from Rexnord Corporation, Milwaukee, Wis. As best seen in FIG. 8 (which is a sectional view of the embodiment depicted in FIG. 6), the other end of floating beam 50 carries a roller bearing 68 which is constrained by a cam slot 78 formed in the hinge rib 18. The roller bearing 68 is free to roll back and forth along the length of the cam slot 78 as the floating beam 50 (which supports the rotary actuator 2) pivots about an axis that intersects and is orthogonal to the axis of its transverse shaft (not shown). This arrangement gives the rotary actuator 2 the ability to float during operation so that all of the actuation reaction load will be carried by the reaction links 52 and 54.

Figure 9:
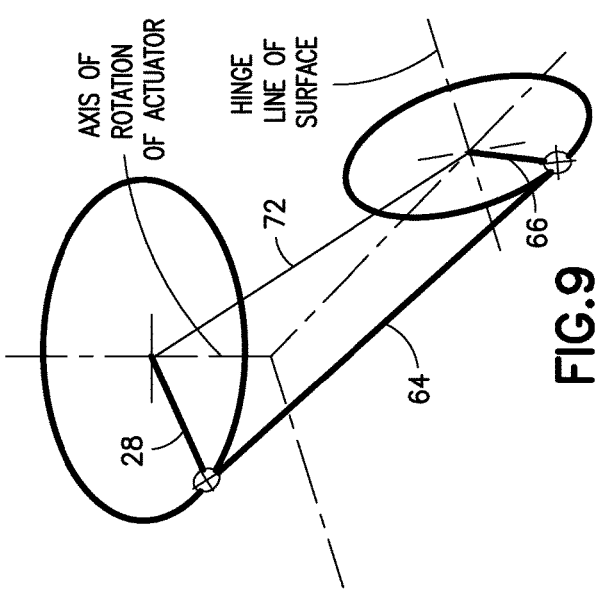
FIG. 9 is a diagram representing a spatial four-bar linkage for coupling a rotary actuator to a control surface in accordance with the embodiment depicted in FIGS. 6 through 8.

As shown in FIGS. 6 and 7, the rotary actuator comprises an output shaft 26. The output shaft 26 is connected to the control surface 4 via an output crank 28 mounted to output shaft 26, a push rod 64 having one end rotatably coupled (e.g., by means of a spherical bearing) to one end (e.g., a clevis) of the output crank 28, and a horn arm 66 having one end (e.g., a clevis) rotatably coupled (e.g., by means of a spherical bearing) to the other end of push rod 64 and another end affixed to the control surface 4 in an area intersected by the hinge line 24. More specifically, the axis of rotation of horn arm 66 is preferably coaxial with the hinge line 24 of control surface 4, as depicted in FIG. 9.

The arrangement depicted in FIGS. 6 and 7 provides an apparatus in which the rotary actuator 2 is coupled to the control surface 4 via a spatial four-bar linkage that tolerates wing and/or hinge line deflection. That spatial four-bar linkage, diagrammatically represented in FIG. 9, comprises the output crank 28, the push rod 64, the horn arm 66 and the stationary ground link 72. The control surface 4 will deflect upwards if output shaft 26 of rotary actuator 2 is rotated counter-clockwise (from the vantage point of FIG. 6). The control surface 4 will deflect downwards if output shaft 26 is rotated clockwise.

Figure 11:
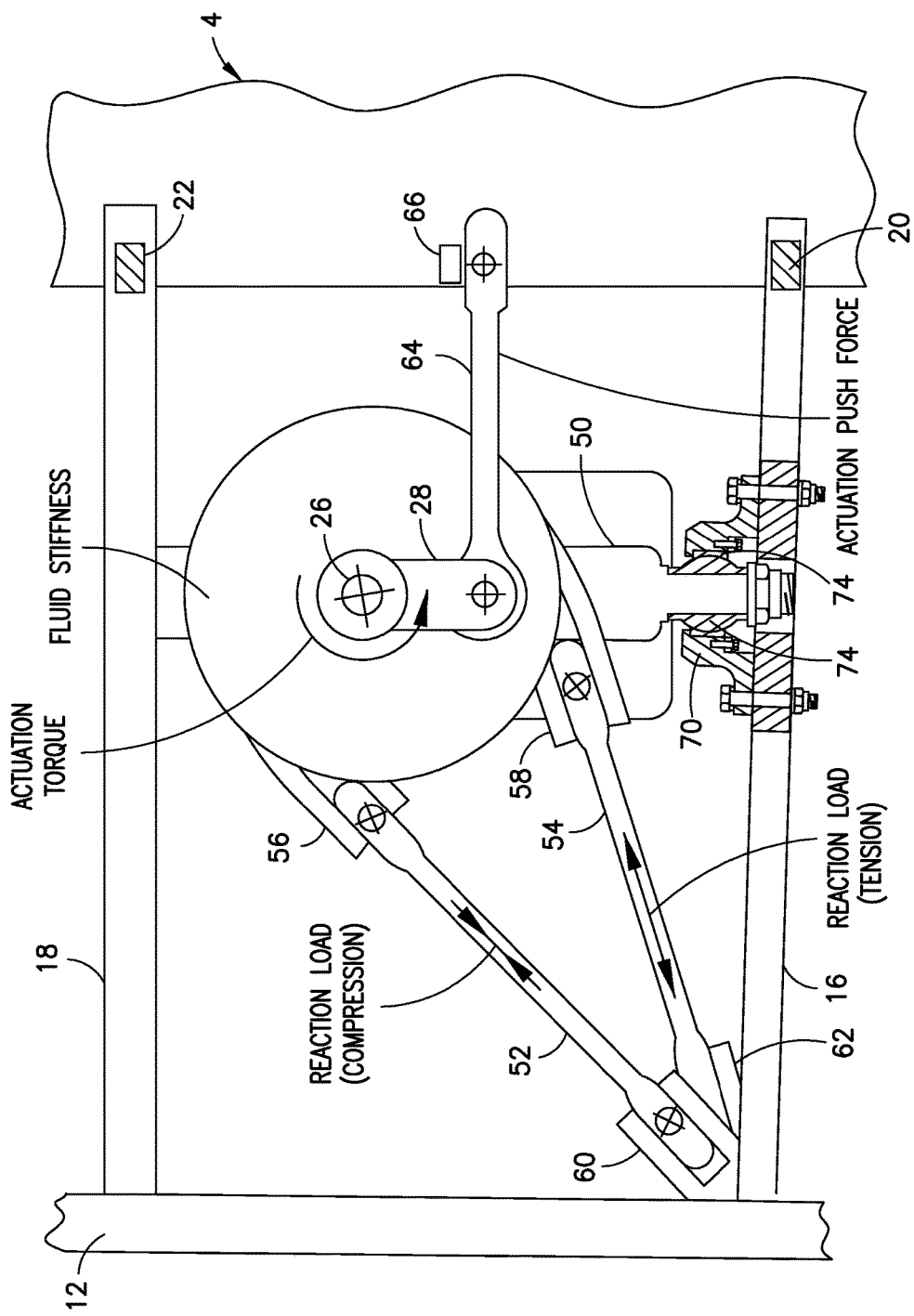
FIG. 11 is a diagram representing a plan view virtually identical to that of FIG. 6, except for the addition of arrows indicating loads and torques typically produced during rotary actuation of a control surface.

FIG. 11 is a diagram representing a plan view virtually identical to that of FIG. 6, except for the addition of arrows indicating loads and torques typically produced during rotary actuation of the control surface 4. The reaction links 52 and 54 distribute the reaction forces to the rear spar 12 of aircraft structure. Again this method of distributing reaction forces to the primary structure meets the actuator integration objective of minimal aircraft changes after initial design. This design results in minimal impact to production because, as shown in FIG. 11, the required stiffness path from the control surface 4 through the rotary actuator 2 to the aircraft structure can be met by changing the stiffness of one or both reaction links 52, 54.

Use of reaction link results in a lighter weight design because it can be optimized to provide an actuation system consistent with the following constraints: (1) The static stiffness of the actuation system needs to be high because of actuation accuracy under aerodynamic load. (2) The static stiffness of the rotary actuator cannot be so high with multiple rotary actuators (installed in parallel) because their force fight management requires a carefully chosen static stiffness. (3) The dynamic stiffness is of importance for flutter consideration because a rotary vane actuator and a rotary piston actuator each have frequency-dependent stiffness. In addition, the actuation systems disclosed hereinabove allow less cost during flight testing in case the stiffness of the actuation system needs to be changed. Also the control surface and the rotary actuator are not affected.

While apparatus and methods for actuating a control surface using rotary actuators have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The invention claimed is:

1. An apparatus comprising:
    an aircraft structure;
    first and second hinges coupled to said aircraft structure;
    a control surface coupled to said first and second hinges;
    a rotary actuator comprising a housing and an output shaft rotatable relative to said housing, the output shaft being coupled to said control surface for causing pivoting of said control surface about a hinge line;
    a first reaction link having a first end rotatably coupled to said housing of said rotary actuator for transmitting reaction forces to said aircraft structure during pivoting of said control surface;
    a second reaction link having a first end rotatably coupled to said housing of said rotary actuator for transmitting reaction forces to said aircraft structure; and
    a hanger link having a first end rotatably coupled to respective second ends of said first and second reaction links and a second end rotatably coupled to said aircraft structure.

2. The apparatus as recited in claim 1, wherein said aircraft structure comprises a fitting, said apparatus further comprising:
    a pin coupled to a second end of said first reaction link; and
    a spherical bearing that rotatably couples said fitting to said pin.

3. The apparatus as recited in claim 1, wherein said aircraft structure comprises a fitting, said apparatus further comprising:
    a pin coupled to said second end of said hanger link; and
    a spherical bearing that rotatably couples said fitting to said pin.

4. The apparatus as recited in claim 1, further comprising:
    a pin;
    a first spherical bearing that rotatably couples said first end of said hanger link to said pin;
    a second spherical bearing that rotatably couples said second end of said first reaction link to said pin; and
    a third spherical bearing that rotatably couples said second end of said second reaction link to said pin.

5. The apparatus as recited in claim 1, wherein said output shaft of said rotary actuator has an axis of rotation parallel to said axis of rotation of said control surface, said apparatus further comprising an output crank that connects said output shaft to said control surface.

6. An apparatus comprising:
    an aircraft structure comprising first and second ribs, wherein said second rib comprises a slot;
    first and second hinges coupled to said aircraft structure;
    a control surface coupled to said first and second hinges;
    a rotary actuator comprising a housing and an output shaft rotatable relative to said housing, the output shaft being coupled to said control surface for causing pivoting of said control surface about a hinge line; and
    a reaction link having a first end rotatably coupled to said housing of said rotary actuator for transmitting reaction forces to said aircraft structure during pivoting of said control surface;
    first and second spherical bearings attached to said first rib;
    a roller bearing seated in said slot of said second rib; and
    a floating beam having one end connected to said first and second spherical bearings and another end connected to said roller bearing.

7. An apparatus comprising:
    an aircraft structure;
    first and second hinges coupled to said aircraft structure;
    a control surface coupled to said first and second hinges;
    a rotary actuator comprising a housing and an output shaft rotatable relative to said housing, wherein said output shaft of said rotary actuator has an axis of rotation perpendicular to said axis of rotation of said control surface, the output shaft being coupled to said control surface for causing pivoting of said control surface about a hinge line;
    a reaction link having a first end rotatably coupled to said housing of said rotary actuator for transmitting reaction forces to said aircraft structure during pivoting of said control surface;
    an output crank connected said output shaft; and
    a push rod having one end rotatably coupled to said output crank and another end rotatably coupled to said control surface.

8. The apparatus as recited in claim 1, wherein said aircraft structure comprises a wing and said control surface comprises an aileron.

9. The apparatus as recited in claim 8, wherein said wing comprises a rear spar and first and second hinge ribs attached to said rear spar, said first and second hinges being attached to said first and second hinge ribs respectively.

10. An apparatus comprising:
    an aircraft structure;
    first and second hinges coupled to said aircraft structure;
    a control surface coupled to said first and second hinges;
    a rotary actuator comprising a housing and an output shaft rotatable relative to said housing, said output shaft being coupled to said control surface for causing rotation of said control surface about a hinge line;
    a first reaction link having a first end rotatably coupled to said housing of said rotary actuator and a second end rotatably coupled to said aircraft structure during pivoting of said control surface; and
    a second reaction link having a first end rotatably coupled to said housing of said rotary actuator and a second end rotatably coupled to said aircraft structure during pivoting of said control surface.

11. The apparatus as recited in claim 10, wherein said aircraft structure comprises first and second fittings, said apparatus further comprising:
    a first pin coupled to a second end of said first reaction link;
    a first spherical bearing that rotatably couples said first fitting to said first pin;
    a second pin coupled to a second end of said second reaction link; and
    a second spherical bearing that rotatably couples said second fitting to said second pin.

12. The apparatus as recited in claim 10, wherein said aircraft structure comprises first and second ribs, wherein said second rib comprises a slot, said apparatus further comprising:
    first and second spherical bearings attached to said first rib;
    a roller bearing seated in said slot of said second rib; and
    a floating beam having one end connected to said first and second spherical bearings and another end connected to said roller bearing.

13. The apparatus as recited in claim 10, wherein said aircraft structure comprises a wing and said control surface comprises an aileron.

14. A method for distributing reaction forces from a rotary actuator to an aircraft structure, comprising:
   rotatably coupling a first end of a first reaction link to the housing of the rotary actuator;
   rotatably coupling a second end of the first reaction link to a fitting of the aircraft structure;
   rotatably coupling a second end of the reaction link to a fitting of the aircraft structure; and
   rotatably coupling a second end of the reaction link to a fitting of the aircraft structure.

15. A method for distributing reaction forces from a rotary actuator to an aircraft structure, comprising:
   hinging a control surface to an aircraft structure;
   coupling an output shaft of a rotary actuator to the control surface;
   linking a housing of the rotary actuator to the aircraft structure; and
   operating the rotary actuator to cause pivoting of said control surface about a hinge line,
   wherein said linking step comprises:
   rotatably coupling respective first ends of first and second reaction links to the housing of the rotary actuator;
   rotatably coupling respective second ends of the first and second reaction links to a first end of a pin;
   rotatably coupling a first end of a hanger link to the pin; and
   rotatably coupling a second end of the hanger link to a fitting of the aircraft structure.

16. The apparatus as recited in claim 10, wherein said output shaft of said rotary actuator has an axis of rotation perpendicular to said axis of rotation of said control surface, said apparatus further comprising:
   an output crank connected said output shaft; and
   a push rod having one end rotatably coupled to said output crank and another end rotatably coupled to said control surface.

17. The apparatus as recited in claim 6, wherein said aircraft structure comprises a wing and said control surface comprises an aileron.

18. The apparatus as recited in claim 17, wherein said wing comprises a rear spar and first and second hinge ribs attached to said rear spar, said first and second hinges being attached to said first and second hinge ribs respectively.

19. The apparatus as recited in claim 7, wherein said aircraft structure comprises a wing and said control surface comprises an aileron.

20. The apparatus as recited in claim 19, wherein said wing comprises a rear spar and first and second hinge ribs attached to said rear spar, said first and second hinges being attached to said first and second hinge ribs respectively.

* * * * *